United States Patent
Zhao et al.

(10) Patent No.: US 10,057,406 B2
(45) Date of Patent: Aug. 21, 2018

(54) METHOD FOR ADJUSTING TERMINAL SETTING, AND APPARATUS

(71) Applicant: Huawei Technologies Co., Ltd., Shenzhen (CN)

(72) Inventors: Xiaona Zhao, Beijing (CN); Xinmiao Chang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/563,216

(22) PCT Filed: Mar. 31, 2015

(86) PCT No.: PCT/CN2015/075579
§ 371 (c)(1),
(2) Date: Sep. 29, 2017

(87) PCT Pub. No.: WO2016/154916
PCT Pub. Date: Oct. 6, 2016

(65) Prior Publication Data
US 2018/0091642 A1    Mar. 29, 2018

(51) Int. Cl.
*H04M 3/00*    (2006.01)
*H04M 1/725*    (2006.01)

(52) U.S. Cl.
CPC .............................. *H04M 1/72569* (2013.01)

(58) Field of Classification Search
CPC ................................................ H04M 1/72569
See application file for complete search history.

(56) References Cited

U.S. PATENT DOCUMENTS

| 7,215,978 B2 | 5/2007 | Hasegawa |
| 8,823,484 B2 | 9/2014 | Kennedy et al. |
| 2005/0075096 A1 | 4/2005 | Aljuraid |
| 2014/0058679 A1* | 2/2014 | Varoglu ............ H04M 1/72569 702/19 |

FOREIGN PATENT DOCUMENTS

| CN | 1498011 A | 5/2004 |
| CN | 101415261 A | 4/2009 |
| CN | 102821205 A | 12/2012 |
| CN | 103019825 A | 4/2013 |
| CN | 103200324 A | 7/2013 |
| CN | 103412789 A | 11/2013 |
| CN | 103873673 A | 6/2014 |
| CN | 104065822 A | 9/2014 |
| EP | 1408676 A1 | 4/2004 |

* cited by examiner

*Primary Examiner* — Wayne H Cai
(74) *Attorney, Agent, or Firm* — Leydig, Voit & Mayer, Ltd.

(57) ABSTRACT

The present disclosure provide a method for adjusting a terminal setting, and an apparatus. The method is applied to a terminal, and the method includes: if a first trigger event is detected, obtaining, from control conditions, a first control condition corresponding to the first trigger event, where the first trigger event includes a first operation event operating a first application or that a current system time of the terminal reaches a preset starting time associated with the first application, and adjusting the terminal setting according to the first control condition. As such, when a same function or different profiles are used, a setting does not need to be manually adjusted, thereby improving use experience of a user for a terminal.

19 Claims, 7 Drawing Sheets

METHOD FOR ADJUSTING TERMINAL SETTING, AND APPARATUS

CROSS-REFERENCE TO RELATED APPLICATIONS

This application is a national stage application of International Application No. PCT/CN2015/075579, filed on Mar. 31, 2015, which is hereby incorporated by reference in its entirety.

TECHNICAL FIELD

The present disclosure relates to the field of data processing, and in particular, to a method for adjusting a terminal setting, and an apparatus.

BACKGROUND

Currently, a mobile terminal has increasingly diverse functions, and in addition to basic instant messaging and call functions, the mobile terminal also has many functions such as photographing, video recording, games, audio and video, and networking. To enable all settings of the mobile terminal to satisfy different environmental requirements, the mobile terminal further has various working modes, for example, various profiles such as a standard mode, a meeting mode, a sleep mode, and a drive mode. When a user uses a terminal setting such as a same function or different profiles in different environments or at different time in a same environment, the user needs to manually adjust all the settings of the mobile terminal so as to enable the mobile terminal to achieve an optimal use effect. For example, in a relatively noisy area such as the subway, a concert field, or a sports game field, volume of a prompt tone needs to be turned up or a vibration level of the mobile terminal needs to be heightened, and volume of multimedia (such as audio, videos, or games) needs to be turned up. However, in a relatively quiet area such as a meeting room or a classroom, the volume of the prompt tone needs to be turned down or the vibration level needs to be lowered. For another example, in a fixed area providing a Wi-Fi network such as at home or in an office building, a WLAN service needs to be turned on. In a mobile area without a Wi-Fi network such as a bus or a subway, a data service needs to be turned on. In addition, to prevent the mobile terminal from frequently receiving wireless connection prompts when passing through places with a Wi-Fi network or to prevent temporary interruptions of a mobile network and power loss that are caused by automatic connection attempts, the WLAN service needs to be turned off. For still another example, a mode is set as a sleep mode when the user is at rest, and the mode is set as a standard mode when the user normally moves. On an airplane, the mode is set as an airplane mode, and in a private car, the mode is set as a drive mode, and so on.

Therefore, when a user needs to use a terminal setting such as different settings of a same function or different profiles in different environments or at different time in a same environment, in order to enable a particular function or profile to achieve an optimal use effect, the user needs to repeatedly and manually adjust the terminal setting. An adjustment process is relatively complex and user experience is relatively poor. In addition, problems such as missing an important call or interfering another person may occur because the adjustment is not performed in a timely manner.

SUMMARY

The present disclosure provides a method for adjusting a terminal setting, and an apparatus. The method and the apparatus that are provided in the present disclosure resolve prior-art problems that a user needs to repeatedly and manually adjust a terminal setting such as a function or a profile, to enable the terminal setting to achieve an optimal use effect, an adjustment process is relatively complex, and user experience is relatively poor.

According to a first aspect, a method for adjusting a terminal setting is provided. The method is applied to a terminal, and the method includes:

if a first trigger event is detected, obtaining, from control conditions, a first control condition corresponding to the first trigger event, where the first trigger event includes a first operation event operating a first application or that a current system time of the terminal reaches a preset starting time associated with the first application; and adjusting the terminal setting according to the first control condition.

With reference to the first aspect, in a first possible implementation manner, the method includes:

the preset closing time associated with the first application includes: a time generated according to received user input information, a time obtained by collecting statistics of all previous closing time at which the first application is closed, or an end time corresponding to a use validity period of the first application; and the preset control duration associated with the first application includes: duration generated according to the received user input information, duration obtained by collecting statistics of all previous use duration within which the first application is used, or duration corresponding to the use validity period of the first application.

With reference to the first aspect or the first possible implementation manner of the first aspect, in a second possible implementation manner, the first application is a non-contact application, and the first operation event includes: the first application is read by a non-contact reader/writer.

With reference to any one of the first aspect, or the first or the second possible implementation manner of the first aspect, in a third possible implementation manner, before the adjusting the terminal setting according to the first control condition, the method further includes:

recording a current first specified value of the terminal setting that needs to be adjusted according to the first control condition; and after the adjusting the terminal setting according to the first control condition, the method further includes:

obtaining the first specified value if a second trigger event is detected, where the second trigger event includes a second operation event operating the first application, or that the current system time of the terminal reaches the preset closing time associated with the first application, or that use duration in the first control condition reaches the preset control duration associated with the first application; and adjusting, according to the first specified value, the terminal setting corresponding to the first control condition.

With reference to the third possible implementation manner of the first aspect, in a fourth possible implementation manner, the first application is a non-contact application, and the second operation event includes: the first application is read by a non-contact reader/writer for the second time.

With reference to any one of the first aspect, or the first to the fourth possible implementation manners of the first aspect, in a fifth possible implementation manner, the preset starting time associated with the first application includes: the time generated according to the received user input information, a time obtained by collecting statistics of all previous starting time at which the first application is started, or a start time corresponding to the use validity period of the first application.

With reference to any one of the first aspect, or the first to the fifth possible implementation manners of the first aspect, in a sixth possible implementation manner, before the obtaining, from control conditions by using the first trigger event, a first control condition corresponding to the first trigger event, the method further includes:

generating the first control condition according to any one or a combination of a type of the first application, a second specified value corresponding to the terminal setting within a preset time period during or after all previous running of the first application, or received user indication information.

With reference to the sixth possible implementation manner of the first aspect, in a seventh possible implementation manner, the generating the first control condition according to a second specified value corresponding to the terminal setting within a preset time period during or after all previous running of the first application includes:

obtaining the second specified value corresponding to the terminal setting within the preset time period during or after all the previous running of the first application, and using the second specified value to obtain a first specified statistic value corresponding to the terminal setting; and generating the first control condition by using the first specified statistic value.

With reference to the first aspect, in an eighth possible implementation manner, before the obtaining, from control conditions by using the first trigger event, a first control condition corresponding to the first trigger event, the method further includes:

determining, according to a type of the first application, the terminal setting that needs to be adjusted;

obtaining, according to a third specified value that corresponds to the terminal setting and that is generated during all previous use of the terminal, a second specified statistic value corresponding to the terminal setting; and generating the first control condition by using the second specified statistic value or the second specified statistic value and received user indication information.

With reference to the first aspect, in a ninth possible implementation manner, before the obtaining, from control conditions by using the first trigger event, a first control condition corresponding to the first trigger event, the method further includes:

determining, according to a type of the first application, the terminal setting that needs to be adjusted;

receiving a fourth specified value that is input by a user and that corresponds to the terminal setting; and generating the first control condition by using the fourth specified value.

With reference to any one of the first aspect, or the first to the ninth possible implementation manners of the first aspect, in a tenth possible implementation manner, when the first control condition includes multiple sub-control conditions, the multiple sub-control conditions respectively correspond to different control time, and the sub-control conditions respectively correspond to different terminal settings and/or different specified values of a same terminal setting, the adjusting the terminal setting according to the first control condition includes:

sequentially invoking the multiple sub-control conditions according to the control time respectively corresponding to the multiple sub-control conditions; and adjusting the terminal setting according to each sub-control condition.

With reference to any one of the first aspect, or the first to the tenth possible implementation manners of the first aspect, in an eleventh possible implementation manner, the terminal setting includes any one or a combination of a profile of the terminal, playback volume of the terminal, a use status of a second application of the terminal, or a connection status between the terminal and another terminal.

According to a second aspect, a terminal is provided, and the terminal includes:

a processor, configured to: if a first trigger event is detected, obtain, from control conditions, a first control condition corresponding to the first trigger event, where the first trigger event includes a first operation event operating a first application or that a current system time of the terminal reaches a preset starting time associated with the first application, and adjust a terminal setting according to the first control condition; and a memory, configured to store relevant data run by the processor.

With reference to the second aspect, in a first possible implementation manner, the processor is further configured to: determine the preset closing time associated with the first application according to a time generated according to received user input information, or a time obtained by collecting statistics of all previous closing time at which the first application is closed, or an end time corresponding to a use validity period of the first application; and determine the preset control duration associated with the first application according to duration generated according to the received user input information, or duration obtained by collecting statistics of all previous use duration within which the first application is used, or duration corresponding to the use validity period of the first application.

With reference to the second aspect or the first possible implementation manner of the second aspect, in a second possible implementation manner, the first application is a non-contact application, and the processor is further configured to: when it is detected that the first application is read by a non-contact reader/writer, determine that the first operation event is detected.

With reference to any one of the second aspect, or the first or the second possible implementation manner of the second aspect, in a third possible implementation manner, the processor is further configured to: before adjusting the terminal setting according to the first control condition, record a current first specified value of the terminal setting that needs to be adjusted according to the first control condition, after adjusting the terminal setting according to the first control condition, obtain the first specified value if a second trigger event is detected, where the second trigger event includes a second operation event operating the first application, or that the current system time of the terminal reaches the preset closing time associated with the first application, or that use duration in the first control condition reaches the preset control duration associated with the first application, and adjust, according to the first specified value, the terminal setting corresponding to the first control condition.

With reference to the third possible implementation manner of the second aspect, in a fourth possible implementation manner, the first application is a non-contact application, and the processor is further configured to: when it is detected that the first application is read by a non-contact reader/writer for the second time, determine that the second operation event is detected.

With reference to any one of the second aspect, or the first to the fourth possible implementation manners of the second aspect, in a fifth possible implementation manner, the processor is further configured to determine the preset starting time associated with the first application according to the time generated according to the received user input information, or a time obtained by collecting statistics of all previous starting time at which the first application is started, or a start time corresponding to the use validity period of the first application.

With reference to any one of the second aspect, or the first to the fifth possible implementation manners of the second aspect, in a sixth possible implementation manner, the processor is further configured to generate the first control condition according to any one or a combination of a type of the first application, a second specified value corresponding to the terminal setting within a preset time period during or after all previous running of the first application, or received user indication information.

With reference to the sixth possible implementation manner of the second aspect, in a seventh possible implementation manner, the generating, by the processor, the first control condition according to a second specified value corresponding to the terminal setting within a preset time period during or after all previous running of the first application specifically includes:

obtaining the second specified value corresponding to the terminal setting within the preset time period during or after all the previous running of the first application, and using the second specified value to obtain a first specified statistic value corresponding to the terminal setting; and generating the first control condition by using the first specified statistic value.

With reference to the second aspect, in an eighth possible implementation manner, the processor is further configured to: determine, according to a type of the first application, the terminal setting that needs to be adjusted; obtain, according to a third specified value that corresponds to the terminal setting and that is generated during all previous use of the terminal, a second specified statistic value corresponding to the terminal setting; and generate the first control condition by using the second specified statistic value or the second specified statistic value and received user indication information.

With reference to the second aspect, in a ninth possible implementation manner, the processor is further configured to: determine, according to a type of the first application, the terminal setting that needs to be adjusted; receive a fourth specified value that is input by a user and that corresponds to the terminal setting; and generate the first control condition by using the fourth specified value.

With reference to any one of the second aspect, or the first to the ninth possible implementation manners of the second aspect, in a tenth possible implementation manner, when the first control condition includes multiple sub-control conditions, the multiple sub-control conditions respectively correspond to different control time, and the sub-control conditions respectively correspond to different terminal settings and/or different specified values of a same terminal setting, the adjusting, by the processor, the terminal setting according to the first control condition includes:

sequentially invoking the multiple sub-control conditions according to the control time respectively corresponding to the multiple sub-control conditions; and adjusting the terminal setting according to each sub-control condition.

With reference to any one of the second aspect, or the first to the tenth possible implementation manners of the second aspect, in an eleventh possible implementation manner, the processor is further configured to form the terminal setting by using any one or a combination of a profile of the terminal, playback volume of the terminal, a use status of a second application of the terminal, or a connection status between the terminal and another terminal.

One or two of the foregoing technical solutions have at least the following technical effects:

The method and the apparatus that are provided in the embodiments of the present disclosure detects, in a timely manner, whether there is a trigger event that meets a condition, and if yes, a terminal setting is correspondingly adjusted. Therefore, manual adjustment may be avoided when a same function is used or different profiles are used, thereby improving use experience of a user for a terminal device.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

A terminal mentioned in the embodiments of the present disclosure may include an electronic device such as a mobile phone, a wearable device (such as a smart watch, a smart band, or smart glasses), or a tablet computer, and another terminal may include an electronic device such as a mobile phone, a wearable device (such as a smart watch, a smart band, smart glasses, or a Bluetooth headset), a tablet computer, a smart home terminal (such as a smart television, a smart air-conditioner, a smart refrigerator, or a wireless router), or a smart in-vehicle terminal (such as an in-vehicle navigation or an event data recorder).

The following further describes the embodiments of the present disclosure in detail with reference to the accompanying drawings in this specification.

Embodiment 1

Figure 1:
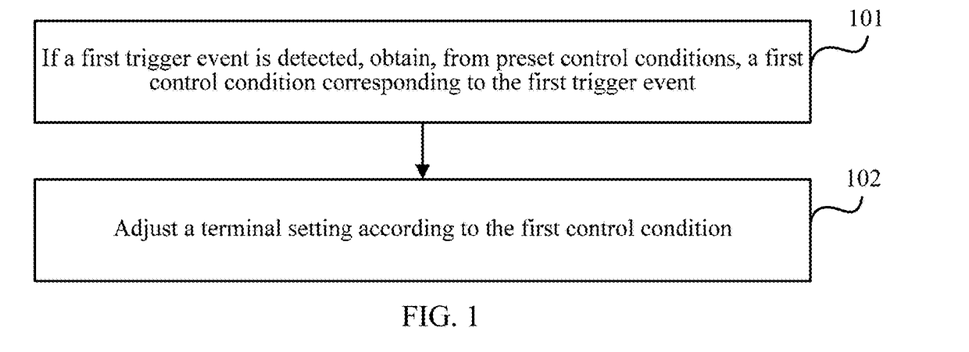
FIG. 1 is a schematic flowchart of a method for adjusting a terminal setting according to Embodiment 1 of the present disclosure.

As shown in FIG. 1, this embodiment of the present disclosure provides a method for adjusting a terminal setting. The method is applied to a terminal, and at least one application is set in the terminal. The method includes the following steps.

Step 101: If a first trigger event is detected, obtain, from control conditions, a first control condition corresponding to the first trigger event, where the first trigger event includes a first operation event operating a first application or that a current system time of the terminal reaches a preset starting time associated with the first application.

In this embodiment of the present disclosure, the first operation event may be any event operating the first application, and in a specific application environment, may be an event that meets a preset condition, such as starting the first application or performing a particular operation on the first application. If the first application is an NFC application such as an electronic key (such as an automobile key or a door key), an electronic admission ticket (such as a concert ticket, an exhibition ticket, or a meeting admission ticket), or an electronic public transport card, the first operation event may be: a user proactively turns on the electronic key, or a user proactively selects the electronic admission ticket, or may be: a terminal detects that the NFC application is read by a card reader (that is, an NFC transceiver of the terminal receives a data reading command sent by the card reader).

In this embodiment of the present disclosure, the preset starting time associated with the first application includes: a time generated according to received user input information, a time obtained by collecting statistics of all previous starting time at which the first application is started, or a start time corresponding to a use validity period of the first application. For example, if the NFC application is an automobile key, a user may set, according to a time at which the user leaves home each day, a fixed time for the automobile key as a starting time of the NFC application. For another example, if the NFC application is an electronic public transport card, a terminal may collect statistics according to all time at which the user uses the electronic public transport card during time periods from 7:00 AM to 9:00 AM and from 6:00 PM to 8:00 PM, so as to obtain a statistical value (such as an average value) as the starting time of the NFC application. For still another example, if the NFC application is an electronic admission ticket, the terminal may use an activity start time (such as a concert start time recorded on a concert ticket, or a particular time point before or after the start time) recorded on the admission ticket as the starting time of the NFC application.

Step 102: Adjust the terminal setting according to the first control condition.

In this embodiment of the present disclosure, the terminal setting may include any one or a combination of a profile of the terminal, playback volume (the playback volume may be any one or a combination of media volume, call volume, ringtone and notification volume, or any other volume of the terminal) of the terminal, a use status of a second application (such as a map navigation application or a mobile phone volume automatic adjustment application installed on the terminal) of the terminal, or a connection status between the terminal and another terminal. The another terminal includes a terminal that has a connection relationship with the terminal. Certainly, the terminal setting includes, but is not limited to, the foregoing listed cases.

For a specific application environment, if a volume value range of a mobile phone incoming call ringtone is 0 to 10, and is mainly divided into three segments: low (0 to 3), medium (4 to 6), and high (7 to 10), statistics collection and analysis may be performed on historical setting data of the mobile phone incoming call ringtone in the three volume segments at ordinary time or within a recent time period T, to obtain a corresponding average value Vi (i=1, 2, or 3).

For example, if the first application is a public transport card, it is preliminarily determined that volume of the mobile phone incoming call ringtone should be enhanced, that is, enhancement adjustment is performed on the volume (for example, a current volume segment is 0 to 3, and a volume segment after the adjustment is 4 to 6), or the volume is directly adjusted to a high volume segment (for example, a current volume segment is 0 to 3, and a volume segment after the adjustment is 7 to 10). Therefore, in combination with the foregoing average value Vi (i=1, 2, or 3) obtained through statistics collection, the first control condition is determined, and a volume setting value corresponding to the mobile phone incoming call ringtone is $V_2$ or $V_3$. Therefore, in this step, the terminal may adjust the volume value of the mobile phone incoming call ringtone to $V_2$ or $V_3$ according to the first control condition. Certainly, similar settings and adjustments may also be performed on the playback volume such as the media volume and the call volume, and another terminal setting, and details are not described herein.

For another example, if the first application is an electronic admission ticket of a symposium, it is preliminarily determined that volume of the mobile phone incoming call ringtone in the setting should be turned down to a low volume segment or be directly muted. Therefore, in combination with the foregoing average value Vi (i=1, 2, or 3) obtained through statistics collection, the first control condition is determined, and a volume setting value corresponding to the mobile phone incoming call ringtone is $V_1$ or 0. Therefore, in this step, the terminal may adjust the volume value of the mobile phone incoming call ringtone to $V_1$ or 0 according to the first control condition. Certainly, similar settings and adjustments may also be performed on the playback volume such as the media volume and the call volume, and another terminal setting, and details are not described herein.

In a specific use environment, if the first application is an electronic public transport card, and if the first operation event is that the electronic public transport card is enabled, it may be determined that a user that uses the electronic public transport card may be in a relatively noisy environment. In order to enable an electronic device to be adapted to the noisy environment, a setting of the electronic device may need to be adjusted (for example, volume of an incoming call/message ringtone, and volume of multimedia such as audio and videos, games, and FM need to be enhanced, and a data service needs to be turned on). The first control condition may be correspondingly generated according to the setting that needs to be adjusted. The foregoing instance is merely a specific example for describing one case of the first application. However, the first application in this embodiment of the present disclosure is not limited to the application: the electronic public transport card.

In this embodiment of the present disclosure, the terminal setting after the adjustment and the terminal setting before the adjustment may be totally different, may be partially the same and partially different, or may be totally the same. That is, if the specified values included in the control condition are different from current specified values of the mobile phone, the terminal setting is readjusted according to the specified value in the first control condition. If some specified values are the same and some are different, readjustment may be performed for the specified values that are different.

If all of the specified values are the same, readjustment may not be performed or readjustment with no change may be performed.

The method provided in this embodiment of the present disclosure detects, in a timely manner, whether there is a trigger event that meets a condition, and if yes, a terminal setting is correspondingly adjusted. Therefore, a problem of complex operations due to that when a same function is used or different profiles are used, the terminal setting needs to be manually adjusted may be avoided, thereby improving use experience of a user for a terminal device.

Embodiment 2

Figure 2:
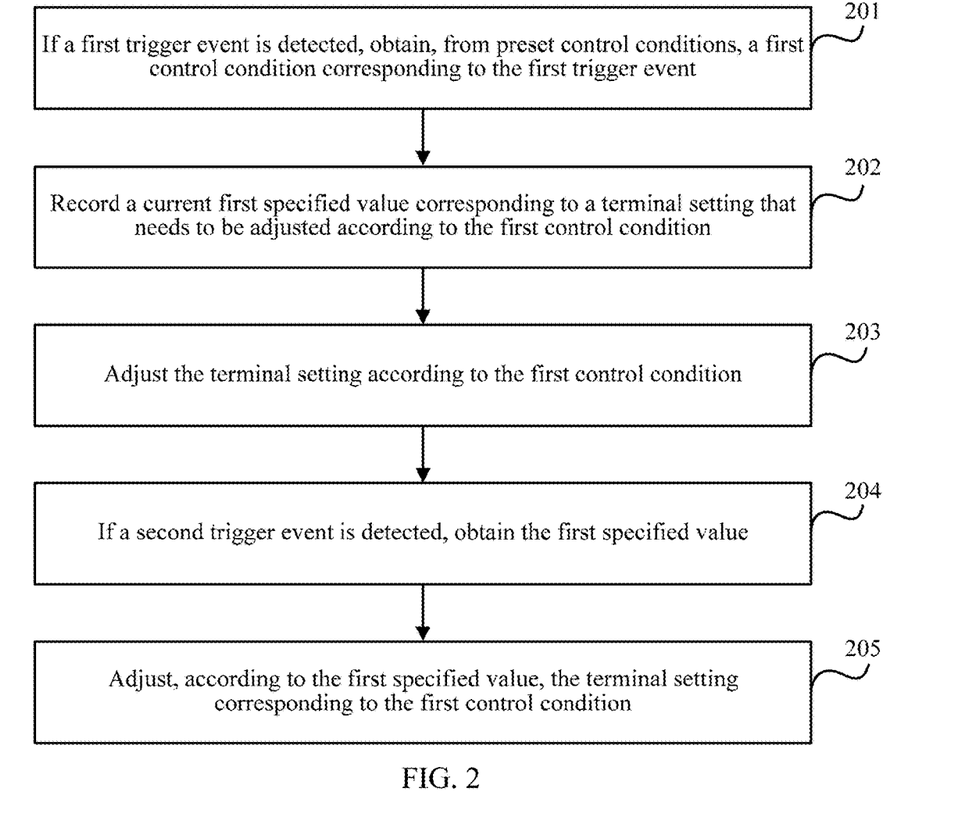
FIG. 2 is a schematic flowchart of a method for adjusting a terminal setting according to Embodiment 2 of the present disclosure.

Generally, a terminal setting needs to be adjusted according to a specific usage scenario of a terminal. The foregoing different NFC applications often have different specific usage scenarios, that is, different NFC applications may need to be used in different use places, and further, the terminal setting may need to be adjusted differently. Therefore, when a use place of the terminal changes, restoring and adjustment of the terminal setting also need to be considered. As shown in FIG. 2, in this embodiment, for a terminal, when a first application is closed or after a period of time after a first application is closed, or after a first application reaches specified use duration, a terminal setting of the electronic device may be adjusted to a status that is before the first application is started. Therefore, in this embodiment of the present disclosure, the following method steps are further used to implement restoring of the setting, and a specific implementation may be:

Step 201: If a first trigger event is detected, obtain, from control conditions, a first control condition corresponding to the first trigger event, where the first trigger event includes a first operation event operating a first application or that a current system time of the terminal reaches a preset starting time associated with the first application.

In this embodiment of the present disclosure, for specific explanations of the first trigger event and the first operation event included in the first trigger event or the preset starting time associated with the first application, refer to corresponding descriptions of step 101 in the foregoing Embodiment 1, and details are not described herein.

Step 202: Record a current first specified value of a terminal setting that needs to be adjusted according to the first control condition.

Specifically, the terminal may determine, according to the first control condition, terminal settings that need to be adjusted, so as to record current first specified values (such as a specified value corresponding to a profile, and/or a specified value corresponding to playback volume, and/or a specified value corresponding to a use status of a second application, and/or a specified value corresponding to a connection status between the terminal and another terminal) of these terminal settings, so that the values can be used when the terminal setting is subsequently restored and adjusted.

Optionally, the terminal may also record all specified values (such as a specified value corresponding to a profile, a specified value corresponding to playback volume, a specified value corresponding to a use status of a second application, and a specified value corresponding to a connection status between the terminal and another terminal) corresponding to the terminal setting.

Step 203: Adjust the terminal setting according to the first control condition.

In this embodiment of the present disclosure, the first control condition, the terminal setting, and a specific adjustment manner are the same as an implementation process and manner of step 102 in Embodiment 1, and details are not described herein.

Step 204: If a second trigger event is detected, obtain the first specified value, where the second trigger event includes a second operation event operating the first application, or that the current system time of the terminal reaches a preset closing time associated with the first application, or that use duration in the first control condition reaches preset control duration associated with the first application.

In this embodiment of the present disclosure, the second operation event may be any event operating the first application, and in a specific application environment, may be an event that meets a preset condition, such as closing the first application or performing a particular operation on the first application. If the first application is an NFC application such as an electronic key (such as an automobile key or a door key), an electronic admission ticket (such as a concert ticket, an exhibition ticket, or a meeting admission ticket), or an electronic public transport card, the second operation event may be: a terminal detects that the NFC application is read by a card reader (that is, an NFC transceiver of the terminal receives a data reading command sent by the card reader). For example, the first application is an electronic public transport card. In a bus in which a passenger needs to swipe a card when getting on and off the bus, if the card is swiped for a first time (an NFC transceiver of a terminal receives a data reading command sent by a card reader), execution of the first control condition is triggered. If the NFC transceiver of the terminal receives a data reading command sent by the card reader again, that is, a second trigger event is detected, the setting of the terminal may be restored (card swiping is detected again, and it indicates that an environment in which a user is located changes or will change; therefore, correspondingly, the terminal setting needs to be restored and adjusted).

The preset closing time associated with the first application includes: a time generated according to received user input information, a time obtained by collecting statistics of all previous closing time at which the first application is closed, or an end time corresponding to a use validity period of the first application.

For example, if the NFC application is an automobile key, a user may set, according to a time at which the user leaves home and how long it needs to be taken on the way each day, a fixed time as a closing time associated with the NFC application. For another example, if the NFC application is an electronic public transport card, a terminal may collect statistics according to all time at which the user uses the electronic public transport card during time periods from 7:00 AM to 9:00 AM and from 6:00 PM to 8:00 PM, so as to obtain a statistical value (such as an average value) as the closing time associated with the NFC application. For still another example, if the NFC application is an electronic admission ticket, the terminal may determine the closing time associated with the NFC application according to an activity start time (such as a concert start time recorded on a concert ticket, or a particular time point before or after the start time) recorded on the admission ticket and activity duration, or an activity end time recorded on the admission ticket.

The preset control duration associated with the first application includes: duration generated according to the received user input information, duration obtained by collecting statistics of all previous use duration within which the first application is used, or duration corresponding to the use validity period of the first application.

For example, if the NFC application is an automobile key, a user may set, according to driving duration each day, fixed duration for the automobile key as the control duration associated with the first application. Alternatively, if the NFC application is an electronic public transport card, a terminal may collect statistics according to all time at which the user uses the electronic public transport card during time periods from 7:00 AM to 9:00 AM and from 6:00 PM to 8:00 PM, so as to obtain a statistical value (such as an average value) as the control duration associated with the NFC application. Alternatively, if the NFC application is an electronic admission ticket, such as a concert ticket, a terminal may use duration of the concert as the control duration associated with the NFC application.

Step 205: Adjust, according to the first specified value, the terminal setting corresponding to the first control condition.

For example, if the first application is a public transport card, before the first trigger event occurs, all specified values (for example, the volume is in a volume range of 0 to 3) of the terminal are recorded. After the terminal setting is adjusted according to the first control condition, the terminal setting changes (which may be that volume of an incoming call ringtone is increased, for example, the volume is in the volume segment of 0 to 3 before the adjustment, and is in a volume segment of 4 to 6 after the adjustment). In this embodiment, if there is a second trigger event meeting the condition, correspondingly, all settings of the terminal need to be restored to those before the adjustment triggered by the first trigger event. That is, after detecting the second trigger event, the terminal obtains all the specified values recorded by the terminal setting corresponding to the first control condition before step 203, so as to restore and adjust the corresponding terminal setting (in this instance, the volume of the terminal is restored from the volume segment of 4 to 6 to the volume segment of 0 to 3).

In the solution provided in this embodiment of the present disclosure, a terminal setting is adjusted once according to one trigger event, and this adjustment is an adaptive adjustment for a particular environment in which a user is located. However, the user is not in the environment for a long time. Therefore, when it is determined, according to a second trigger time, that the environment in which the user is located is restored to that before the adjustment, correspondingly, the terminal setting is correspondingly restored. Based on the foregoing adjustment process of the terminal setting, the terminal setting can better meet use requirements of the user, and save resources of the terminal to some extent (for example, when the first trigger event improves parameters of all the settings of the terminal, correspondingly, the environment in which the user is located is restored, and the setting can be correspondingly restored, so that energy consumption of a mobile phone can be reduced).

Embodiment 3

Figure 3:
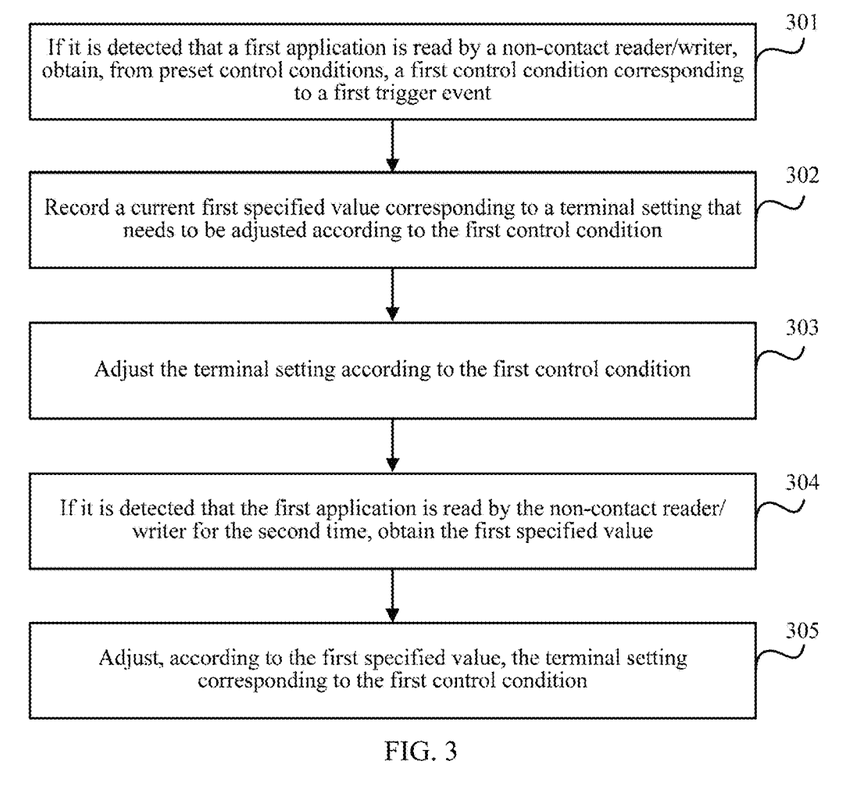
FIG. 3 is a schematic flowchart of a method for adjusting a terminal setting according to Embodiment 3 of the present disclosure.

As shown in FIG. 3, in order to more clearly describe a method provided in this embodiment of the present disclosure in detail, the following further describes the method provided in this embodiment of the present disclosure in detail with respect to a non-contact application. A first operation event may be that a first application is read by a non-contact reader/writer, and a specific implementation may be:

Step 301: If it is detected that the first application is read by the non-contact reader/writer, obtain, from control conditions, a first control condition corresponding to the first trigger event.

If the first application is an electronic public transport card application installed on a terminal, and the terminal interacts with a non-contact reader/writer of a bus, and a bus fee is charged, it may be determined that a holder of the terminal is to take the bus. The corresponding owner will be in a relatively noisy environment. Therefore, correspondingly, a terminal setting needs to be adjusted. Specifically, the terminal setting may be adjusted by using the first control condition. The first control condition is the same as the first control condition in the foregoing Embodiment 1 and Embodiment 2, and details are not described herein.

Step 302: Record a current first specified value of a terminal setting that needs to be adjusted according to the first control condition.

In this embodiment, the first specified value is the same as the first specified value in the foregoing Embodiment 1 and Embodiment 2, and details are not described herein.

Step 303: Adjust the terminal setting according to the first control condition.

In this embodiment, it is for a non-contact and electronic public transport card application, some public transport cards are charged by determining a mileage according to twice of card swiping, that is, a process from card swiping for the first time to get on a bus to card swiping for the second time to get off a bus corresponds to a process of taking the bus by a user. Therefore, a time at which the first application is read by the non-contact reader/writer for the first time is a start time for adjusting the terminal setting, and a time at which the first application is read by the non-contact reader/writer for the second time is a restoring time of the terminal setting. Therefore, a second operation event is that the first application is read by the non-contact reader/writer for the second time, and a specific implementation procedure may include:

Step 304: If it is detected that the first application is read by the non-contact reader/writer for the second time, obtain the first specified value, that is, the second operation event is that the first application is read by the non-contact reader/writer for the second time.

Step 305: Restore and adjust, according to the first specified value, the terminal setting corresponding to the first control condition.

Embodiment 4

Considering that a user has particular living habits, multiple sub-control conditions may be determined for one terminal setting, that is, the first control condition includes multiple sub-control conditions, where the multiple sub-control conditions respectively correspond to different control time, and the sub-control conditions correspond to different terminal settings and/or different specified values of a same terminal setting.

For example, if an application stored on a mobile phone is an NFC door key, multiple sub-control conditions may be determined for a profile according to time periods, such as {a profile, (12:00 to 14:00, a sleep mode), (23:00 to 6:00 of the next day, a sleep mode), (others, a standard mode)}. That is, when the user is at home, during two time periods: 12:00 to 14:00 and 23:00 to 6:00 of the next day, the profile of the mobile phone needs to be set as a sleep mode, and the profile is set as a standard mode the rest of time.

Figure 4:
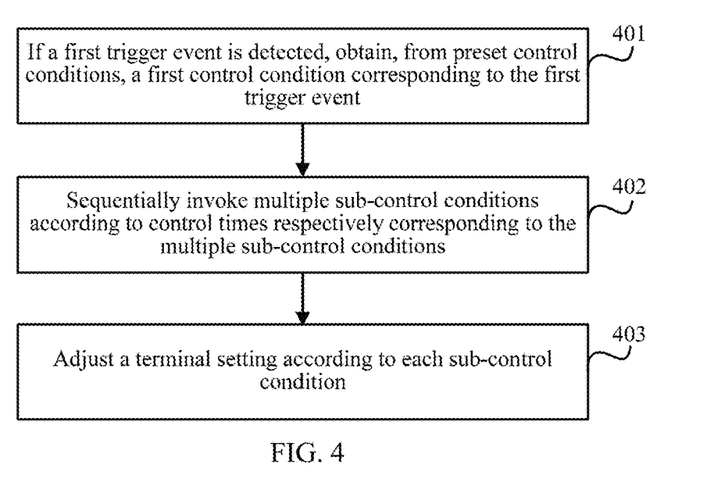
FIG. 4 is a schematic flowchart of a method for adjusting a terminal setting according to Embodiment 5 of the present disclosure.

As shown in FIG. 4, specific implementation steps include:

Step 401: If a first trigger event is detected, obtain, from control conditions, a first control condition corresponding to the first trigger event, where the first trigger event includes a first operation event operating a first application or that a current system time of the terminal reaches a preset starting time associated with the first application.

In this embodiment, the first control condition includes one terminal setting (such as a profile of a mobile phone) and n(n1) sub-control conditions, where each sub-control condition includes a starting time and a corresponding specified value. Certainly, the first control condition may include multiple terminal settings (for example, a profile, game volume, FM volume, music playback volume, or other media volume, starting or closing control of another application on the terminal, and any multiple of connection (such as Bluetooth or Wi-Fi) statuses between the terminal and another terminal), and multiple sub-control conditions corresponding to each terminal setting.

In this embodiment, as an example, if the first application is the foregoing NFC door key, the detecting a first trigger event may be: detecting, by the terminal, that the NFC door key is read by a non-contact card reader (such as an NFC card reader installed on a door of the user), or may be: detecting, by the terminal, that a current time reaches a preset starting time associated with the NFC door key. The preset starting time associated with the NFC door key is a time value set by the user for the NFC door key, or a time value obtained by the terminal by collecting statistics according to all time at which the user uses the NFC door key.

Step 402: Sequentially invoke the multiple sub-control conditions according to control time respectively corresponding to the multiple sub-control conditions.

Step 403: Adjust a terminal setting according to each sub-control condition.

For example, when the user uses the NFC door key to open the door and enters home, the mobile phone is triggered to use the first control condition, or when the mobile phone determines that a current time is a starting time of the NFC door key, the mobile phone is triggered to use the first control condition.

Specific implementation manners for adjusting the terminal setting according to the multiple sub-control conditions in the first control condition may be:

A: The terminal determines, according to n starting time in the foregoing control condition, whether the current time reaches the $i^{th}$ (in) starting time; and if yes, performs step B; otherwise, continues to compare the current time with the $i^{th}$ starting time.

B: The terminal adjusts a corresponding terminal setting according to the $i^{th}$ sub-control condition, and after increasing i by 1, continues to perform step A, until i=n.

In this embodiment, if the user uses the NFC door key when leaving home, when i<n, the user swipes a card to leave home, and a setting of the terminal on which the NFC door key is installed may be restored. In addition, in this embodiment, the control condition may further include control duration, for controlling when to restore the terminal to an original terminal setting. A restoring operation is the same as that in the foregoing embodiment, and details are not described herein.

In this embodiment, based on that behaviors of a user have a particular feature of coherence, multiple sub-control conditions may be invoked based on one trigger event, to consecutively adjust the terminal setting, thereby avoiding repeated operations of the user, simplifying an implementation procedure of the solution of the present disclosure, and improving use experience of the user.

Embodiment 5

A method provided in this embodiment of the present disclosure is for adjustment of different settings performed on different applications on a terminal, that is, these different applications respectively correspond to different control conditions. Therefore, before a first control condition corresponding to a first trigger event is obtained from a control condition by using the first trigger event, the first control condition may also be generated according to the following methods. The following implementable manners are (the methods for generating the first control condition provided in this embodiment may be combined with any one of the foregoing Embodiment 1, Embodiment 2, Embodiment 3, or Embodiment 4 to resolve problems in the prior art):

Method 1: Generate the first control condition according to any one or a combination of a type of the first application, a second specified value corresponding to the terminal setting within a preset time period during or after all previous running of the first application, or received user indication information.

Specifically, parameters for generating the first control condition may be used separately or may be used in combination. A specific implementation manner of generating the first control condition in this embodiment of the present disclosure is described in detail below by using an example in which the first control condition is generated according to the second specified value corresponding to the terminal setting within the preset time period during or after all the previous running of the first application, including:

obtaining the second specified value corresponding to the terminal setting within the preset time period during or after all the previous running of the first application, and using the second specified value to obtain a first specified statistic value corresponding to the terminal setting; and generating the first control condition by using the first specified statistic value.

In the method of this embodiment, the first application may be an application (such as an electronic public transport card, an NFC door key, or an NFC automobile key, and the application does not fail unless the application is deleted or uninstalled) that can be repeatedly used. For these applications, the first control condition may be determined for a terminal setting such as some functions and/or a profile according to a use habit (that is, historical data of the terminal setting of the first application during or after all the previous running of the first application) of a user.

For example, if a terminal (such as a mobile phone) detects that the first application is an electronic public transport card, the terminal preliminarily determines that volume of a mobile phone incoming call/message ringtone, and volume of multimedia such as audio and videos, games, and FM need to be enhanced, and a data service needs to be turned on. Then, the mobile phone may collect statistics of historical data (that is, the foregoing second specified value) related to volume of an incoming call/message ringtone, and volume of the multimedia such as audio and videos, games, and FM that are used within a time period from swiping the electronic public transport card by the user for getting on a bus to getting off the bus each time, so as to obtain a average volume value or an average value (that is, the foregoing first specified statistic value) for volume of each type of media. In addition, the mobile phone collects statistics of a quantity of time of turning on or turning off of the data service within the time period, to obtain a status value (for example, the status value being 1 indicates turning on, and being 0 indicates turning off) (that is, the foregoing first specified statistic value). Finally, the mobile phone may generate the first control condition according to these first specified statistic values: the one or more average volume values and the status value related to the data service that are obtained through statistics collection.

In addition, the first application may also be an application (an application that may fail after being used for several time (for example, twice) such as a scenic spot ticket, or an exhibition ticket) that can be used only for a limited quantity of time. In this case, a first control condition may be determined for the terminal setting such as some functions and/or a profile according to a use habit of the user.

For example, the first application is a scenic spot ticket stored on the mobile phone, and use duration of the ticket is limited only to duration from a very day on which a visitor buys the scenic spot ticket to a time before 9:00 AM of the next day. Therefore, the mobile phone may generate the first control condition according to an adjustment (for example, a mobile phone ringtone is set as vibration, volume of a music player is set to maximum, a Bluetooth connection is established between the mobile phone and a smart band, or a Bluetooth connection is established between the mobile phone and Bluetooth volume) performed by the user on the terminal setting after the user uses the ticket to enter the scenic spot on the day that the user buys the ticket. After the user uses the ticket to enter the scenic spot again before 9:00 AM of the next day, the mobile phone adjusts corresponding terminal settings according to terminal setting values in the first control condition.

In addition, before the first control condition is finally determined, the user is prompted by using a human-computer interaction interface (for example, in a form of a pop-up window) to confirm or adjust specified values (that is, the foregoing first specified statistic value) in the first control condition. Certainly, the user may also cancel the first control condition, that is, a corresponding first control condition is not set for the first application.

Method 2: Before the obtaining, from control conditions by using a first trigger event, a first control condition corresponding to the first trigger event, the generating the first control condition may also be implemented in the following manners:

determining, according to a type of the first application, the terminal setting that needs to be adjusted;

obtaining, according to a third specified value that corresponds to the terminal setting and that is generated during all previous use of the terminal, a second specified statistic value corresponding to the terminal setting; and generating the first control condition by using the second specified statistic value or the second specified statistic value and received user indication information.

In the method of this embodiment, the first application may be an application (such as an electronic public transport card, an NFC door key, or an NFC automobile key, and the application does not fail unless the application is deleted or uninstalled) that can be repeatedly used, or may be an application (an application that fails after being used only once such as a concert ticket or a symposium admission ticket, or an application that may fail after being used for several time (for example, twice) such as a scenic spot ticket or an exhibition ticket) that can be used only for a limited quantity of time. For these applications, after it is preliminarily determined, according to specific types of the applications, terminal settings on which enhancement or weakening adjustment is performed, the first control condition is determined by collecting statistics of historical setting data generated when the user uses the terminal settings at ordinary time or within a recent time period.

For example, if a mobile phone detects that a downloaded first application is a symposium admission ticket, the mobile phone preliminarily determines that volume an incoming call/message ringtone of the mobile phone needs to be turned down or set to mute or vibration, a profile needs to be switched to a meeting mode, volume of multimedia such as audio and videos needs to be turned down (assuming that on the mobile phone, the volume is divided into three segments: low, medium, and high, in this example, it is determined that the volume needs to be turned down to a low volume segment), or a smart band needs to be connected to the mobile phone by means of Bluetooth and a message push function needs to be enabled. Then the mobile phone may set a specified value corresponding to the profile as a meeting mode, collect statistics of historical data (that is, the foregoing third specified value) generated on a low volume segment by an incoming call/message ringtone, and multimedia such as audio and videos, games, and FM that are used by the user within a recent time period, to obtain an average volume value or an average value (that is, the foregoing second specified statistic value) for volume of each type of media, and set a specified value corresponding to a Bluetooth connection status between the mobile phone and the smart band as enabled and set a specified value corresponding to the message push function as enabled. Finally, the mobile phone determines the first control condition according to these foregoing specified values and the second specified statistic value. In addition, before the first control condition is finally determined, the user is prompted by using a human-computer interaction interface (for example, in a form of a pop-up window) to confirm or adjust specified values (that is, including the foregoing second specified statistic value) in the first control condition. Certainly, the user may also cancel the first control condition, that is, a corresponding first control condition is not set for the first application.

For other types of first applications, including an application that can be repeatedly used and an application that can be used only for a limited quantity of time, the method for generating the first control condition by the mobile phone is the same as that in the foregoing example, and details are not described herein.

Method 3: Before the obtaining, from control conditions by using a first trigger event, a first control condition corresponding to the first trigger event, the generating the first control condition may also be implemented in the following manners:

determining, according to a type of the first application, the terminal setting that needs to be adjusted;

receiving a fourth specified value that is input by a user and that corresponds to the terminal setting; and generating the first control condition by using the fourth specified value.

In the method of this embodiment, the type of the first application is the same as that in the foregoing method 1 and method 2, and details are not described herein.

For example, if the first application is an electronic public transport card, a mobile phone preliminarily determines, according to a type (electronic public transport card) of the first application, that if there is a first trigger event, volume of an incoming call/message ringtone, and volume of multimedia such as audio and videos, games, and FM of the mobile phone need to be enhanced, and a data service needs to be turned on. Then the mobile phone prompts a user by using a human-computer interaction interface (for example, in a form of a pop-up window) to set volume values corresponding to the volume of the incoming call/message ringtone, and the volume of the multimedia such as the audio and videos, the games, and the FM, and select the data service for confirmation. Finally, the mobile phone generates the first control condition according to a specified value (that is, the fourth specified value) input by the user by means of the human-computer interaction interface (such as a window).

Figure 5A:
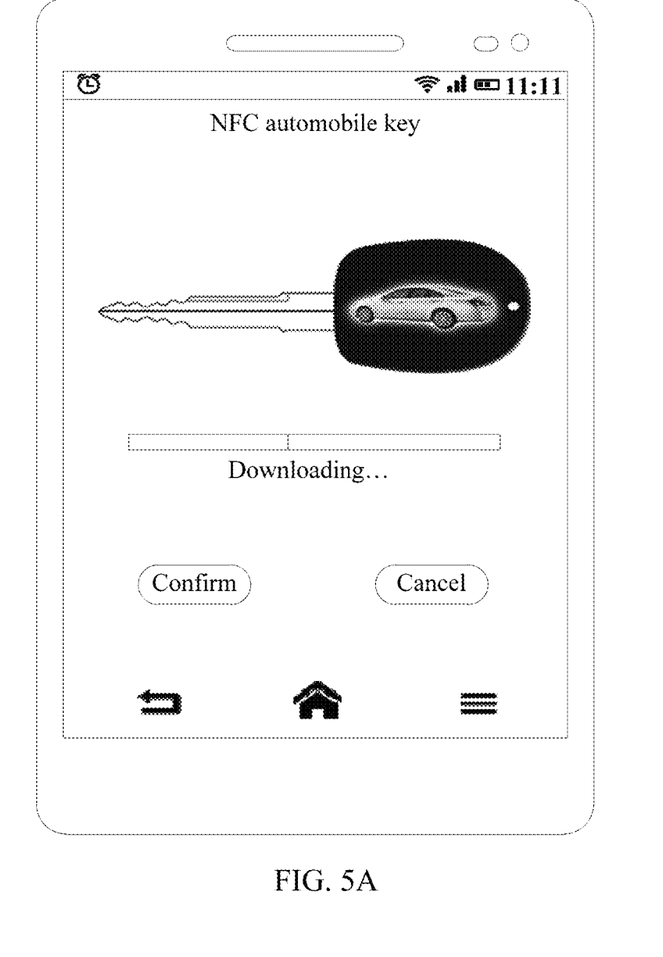
FIG. 5A to FIG. 5D are schematic diagrams of a process for implementing a first control condition determined by a mobile phone when a first application is an NFC automobile key according to an embodiment of the present disclosure.

The following FIG. 5A to FIG. 5D intuitively present, by using a user interface (UI) of the mobile phone, the first control condition determined by the mobile phone when the first application is an NFC automobile key, and a result of an adjustment performed on a corresponding terminal setting by the mobile phone after the user uses the NFC automobile key to open an automobile door in any one of the foregoing methods, and are specific as follows:

(1) An NFC automobile key application is downloaded to the mobile phone (as shown in FIG. 5A).

Figure 5B:
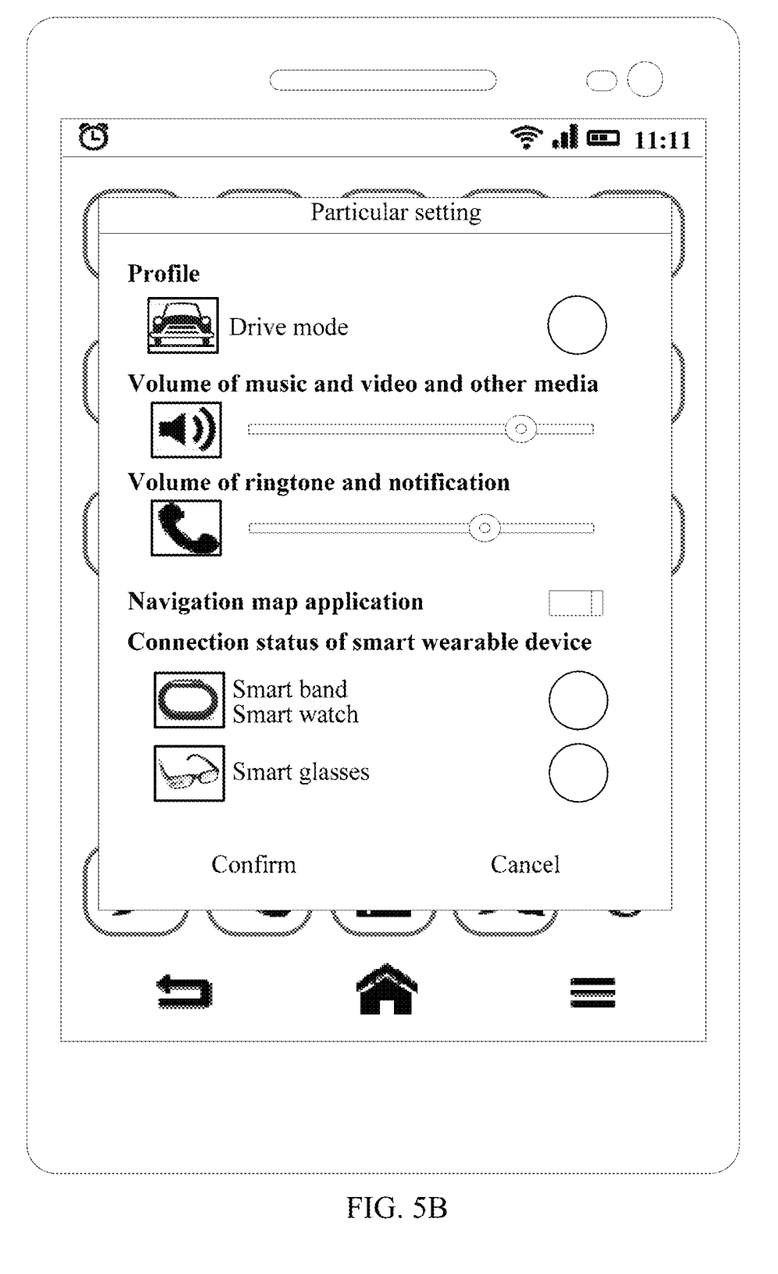

(2) The mobile phone determines, according to a type of the application, that a profile of the mobile phone needs to be switched to a drive mode, multimedia volume needs to be adjusted to a high volume segment, a mobile phone navigation map application (such as Amap or Baidu Maps) needs to be opened, a smart band needs to be connected to the mobile phone by means of Bluetooth, and a Bluetooth connection between smart glasses and the mobile phone needs to be disconnected, so as to determine the first control condition according to these terminal setting values (as shown in FIG. 5B).

Figure 5C:
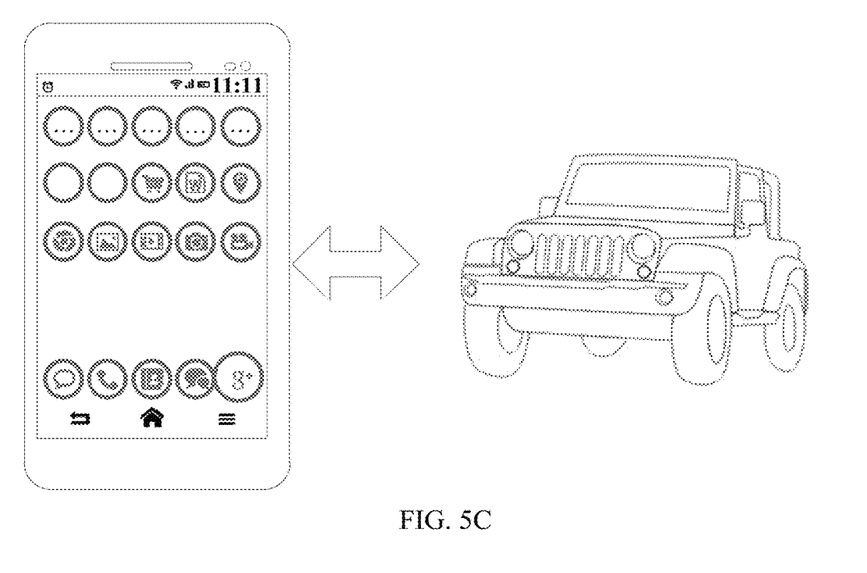

(3) When the user places the mobile phone close to an automobile door lock (that is, an NFC card reader), the mobile phone detects that the NFC automobile key is read (as shown in FIG. 5C).

Figure 5D:
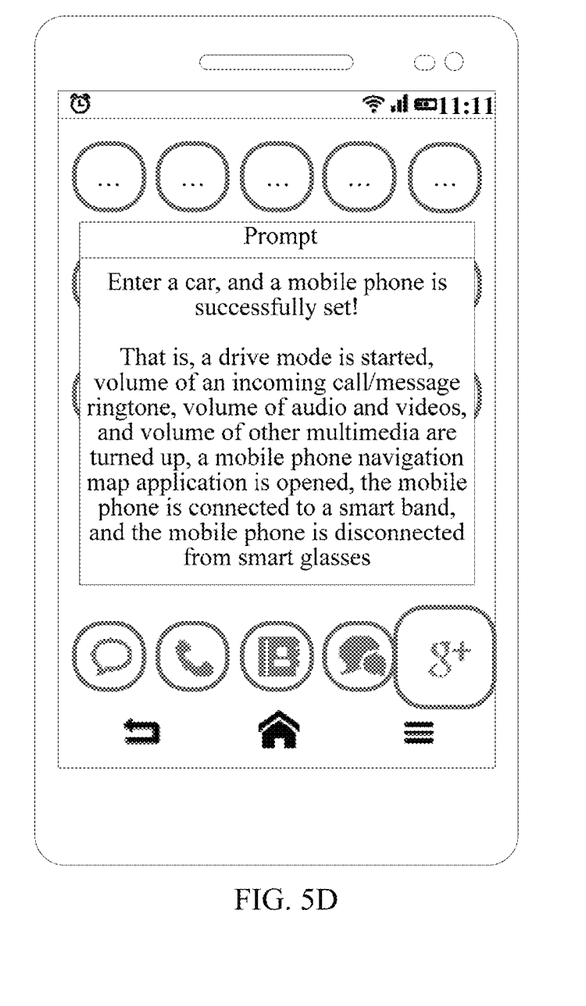

(4) The mobile phone automatically adjusts the terminal settings according to the first control condition in the foregoing step (2), that is, starts a drive mode, turns up volume of an incoming call/message ringtone, volume of audio and videos, and volume of other multimedia, opens a mobile phone navigation map application, connects to a smart band, and disconnects from smart glasses (as shown in FIG. 5D).

This embodiment provides a method for generating multiple control conditions. By means of the method provided in this embodiment, a terminal may adaptively generate, according to data stored in the terminal, a control condition meeting an environmental requirement, and may also generate a control condition according to a parameter input by a user, thereby improving availability of the control condition.

It should be noted that in the solution of this embodiment of the present disclosure, in addition to that different applications on the terminal in the foregoing embodiment respectively correspond to different control conditions, certainly, multiple different applications may correspond to a same control condition. For example, the terminal may set a same control condition for a symposium admission ticket, a library access card, and the like that are stored in the terminal, and set another control condition for a concert ticket, an electronic public transport card, and the like that are stored in the terminal. In conclusion, the solution of the present disclosure does not limit setting manners of control conditions corresponding to different applications on the terminal.

Embodiment 6

Figure 6:
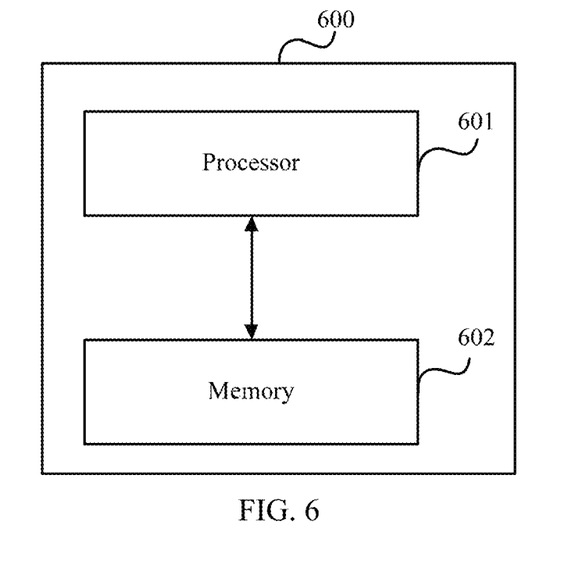
FIG. 6 is a schematic structural diagram of a terminal according to an embodiment of the present disclosure.

As shown in FIG. 6, based on the foregoing method, this embodiment of the present disclosure further provides a terminal 600, and the terminal includes:

a processor 601, configured to: if a first trigger event is detected, obtain, from control conditions, a first control condition corresponding to the first trigger event, where the first trigger event includes a first operation event operating a first application or that a current system time of the terminal reaches a preset starting time associated with the first application, and adjust a terminal setting according to the first control condition, where the processor 601 is further configured to: determine the preset closing time associated with the first application according to a time generated according to received user input information, or a time obtained by collecting statistics of all previous closing time at which the first application is closed, or an end time corresponding to a use validity period of the first application; and determine the preset control duration associated with the first application according to duration generated according to the received user input information, or duration obtained by collecting statistics of all previous use duration within which the first application is used, or duration corresponding to the use validity period of the first application;

the processor 601 is further configured to determine the preset starting time associated with the first application according to the time generated according to the received user input information, or a time obtained by collecting statistics of all previous starting time at which the first application is started, or a start time corresponding to the use validity period of the first application; and the processor 601 is further configured to form the terminal setting by using any one or a combination of a profile of the terminal, playback volume of the terminal, a use status of a second application of the terminal, or a connection status between the terminal and another terminal; and a memory 602, configured to store relevant data run by the processor.

Further, the terminal is adapted to a particular environment after the terminal adjusts a setting based on a trigger condition. However, when a user leaves the particular environment, the setting under the particular environment may not be adapted to another environment. Therefore, a most effective adjustment manner is to adjust the setting of the terminal to one before a trigger event occurs. A specific implementation of the apparatus may be:

The processor 601 is further configured to: before adjusting the terminal setting according to the first control condition, record a current first specified value of the terminal setting that needs to be adjusted according to the first control condition, after adjusting the terminal setting according to the first control condition, obtain the first specified value after a second trigger event is detected, where the second trigger event includes a second operation event operating the first application, or that the current system time of the terminal reaches the preset closing time associated with the first application, or that use duration in the first control condition reaches the preset control duration associated with the first application, and adjust, according to the first specified value, the terminal setting corresponding to the first control condition.

The solution provided in this embodiment of the present disclosure is with respect to an adaptive setting adjustment for the environment in which the terminal is located, and a non-contact application is an application that has great relevance to an actual application environment. Therefore, when the solution of the present disclosure is applied to the non-contact application:

the first application is a non-contact application, and the processor 601 is further configured to: when it is detected that the first application is read by a non-contact reader/writer, determine that the first operation event is detected.

Further, when the terminal needs to restore the setting, the processor 601 is further configured to: when it is detected that the first application is read by the non-contact reader/writer for the second time, determine that the first operation event is detected.

In the solution provided in this embodiment of the present disclosure, different setting adjustments are performed for different applications on the terminal, that is, these different applications respectively correspond to different control conditions. Therefore, before the processor 601 obtains, from the control condition by using the first trigger event, the first control condition corresponding to the first trigger event, the first control condition may further be generated according to the following manners. The following implementable manners are:

Manner 1:

The processor 601 is further configured to generate the first control condition according to any one or a combination of a type of the first application, a second specified value corresponding to the terminal setting within a preset time period during or after all previous running of the first application, or received user indication information.

The generating, by the processor 601, the first control condition according to the second specified value corresponding to the terminal setting within the preset time period during or after all the previous running of the first application specifically includes:

obtaining the second specified value corresponding to the terminal setting within the preset time period during or after all the previous running of the first application, and using the second specified value to obtain a first specified statistic value corresponding to the terminal setting; and generating the first control condition by using the first specified statistic value.

Manner 2:

The processor 601 is further configured to: determine, according to a type of the first application, the terminal setting that needs to be adjusted; obtain, according to a third specified value that corresponds to the terminal setting and that is generated during all previous use of the terminal, a second specified statistic value corresponding to the terminal setting; and generate the first control condition by using the second specified statistic value or the second specified statistic value and received user indication information.

Manner 3:

The processor 601 is further configured to: determine, according to a type of the first application, the terminal setting that needs to be adjusted; receive a fourth specified value that is input by a user and that corresponds to the terminal setting; and generate the first control condition by using the fourth specified value.

Further, considering that a user has particular living habits, multiple sub-control conditions may be determined for one terminal setting, that is, the first control condition includes multiple sub-control conditions, where the multiple sub-control conditions respectively correspond to different control time, and the sub-control conditions correspond to different terminal settings and/or different specified values of a same terminal setting. Therefore, the terminal includes:

when the first control condition includes multiple sub-control conditions, the multiple sub-control conditions respectively correspond to different control time, and the sub-control conditions respectively correspond to different terminal settings and/or different specified values of a same terminal setting, the adjusting, by the processor 601, the terminal setting according to the first control condition includes:

sequentially invoking the multiple sub-control conditions according to the control time respectively corresponding to the multiple sub-control conditions; and adjusting the terminal setting according to each sub-control condition.

The foregoing one or more technical solutions in the embodiments of this application have at least the following technical effects:

By means of the method provided in the embodiments of the present disclosure, in combination with a first application on a terminal, it is detected in a timely manner whether there is a first trigger event that meets a condition, and if yes, a corresponding terminal setting is automatically adjusted according to a control condition of the first application. Therefore, when a user uses a same or multiple terminal settings in different environments or at different time in a same environment, a manual adjustment is no longer needed, but the terminal settings are automatically adjusted in combination with specific applications to achieve an optimal use effect, thereby not only avoiding complex operations caused by manual adjustments, but also fully expanding use of applications downloaded on a mobile phone according to different scenarios, and greatly improving user experience.

The method of the present disclosure is not limited to the embodiments described in the specific implementation manners. Other implementation manners obtained by a person skilled in the art according to the technical solutions of the present disclosure also fall within the technical innovation scope of the present disclosure.

A person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method for adjusting a terminal setting, comprising:
   detecting, by a terminal, a first trigger event;
   obtaining, by the terminal, from control conditions, a first control condition corresponding to the first trigger event, wherein the first trigger event comprises a first operation event operating a first application or that a current system time of the terminal reaches a preset starting time associated with the first application; and
   adjusting, by the terminal, the terminal setting according to the first control condition,
   wherein before the obtaining, from the control conditions, the first control condition corresponding to the first trigger event, the method further comprises:
      determining, according to a type of the first application, the terminal setting to be adjusted;
      obtaining, according to a specified value that corresponds to the terminal setting and that is generated during previous use of the terminal, a specified statistic value corresponding to the terminal setting; and generating the first control condition based on: the specified statistic value, or the specified statistic value and received user indication information.

2. The method according to claim 1, wherein:
a preset closing time associated with the first application comprises: a time generated according to received user input information, a time obtained by collecting statistics of previous closing times at which the first application is closed, or an end time corresponding to a use validity period of the first application; and
a preset control duration associated with the first application comprises: a duration generated according to the received user input information, a duration obtained by collecting statistics of previous use durations within which the first application is used, or a duration corresponding to the use validity period of the first application.

3. The method according to claim 2, wherein:
before the adjusting the terminal setting according to the first control condition, the method further comprises:
recording a current first specified value of the terminal setting to be adjusted according to the first control condition; and
after the adjusting the terminal setting according to the first control condition, the method further comprises:
obtaining the first specified value if a second trigger event is detected, wherein the second trigger event comprises a second operation event operating the first application, or that the current system time of the terminal reaches the preset closing time associated with the first application, or that use duration in the first control condition reaches the preset control duration associated with the first application; and
adjusting, according to the first specified value, the terminal setting corresponding to the first control condition.

4. The method according to claim 3, wherein the first application is a non-contact application, and the second operation event comprises the first application being read by the non-contact application for a second time.

5. The method according to claim 1, wherein the preset starting time associated with the first application comprises: a time generated according to received user input information, a time obtained by collecting statistics of previous starting times at which the first application is started, or a start time corresponding to a use validity period of the first application.

6. The method according to claim 1, wherein the specified value that corresponds to the terminal setting and that is generated during previous use of the terminal is generated within a preset time period during or after previous running of the first application.

7. The method according to claim 1, wherein when the first control condition comprises multiple sub-control conditions, the multiple sub-control conditions respectively correspond to a different control time, and the sub-control conditions respectively correspond to different terminal settings and/or different specified values of a same terminal setting, the adjusting the terminal setting according to the first control condition comprises:
sequentially invoking the multiple sub-control conditions according to the control time respectively corresponding to the multiple sub-control conditions; and
adjusting the terminal setting according to each sub-control condition.

8. The method according to claim 1, wherein the first application is a non-contact application, and the first operation event comprises the first application being read by a non-contact reader/writer.

9. The method according to claim 1, wherein the terminal setting comprises any one or a combination of: a profile of the terminal, a playback volume of the terminal, a use status of a second application of the terminal, or a connection status between the terminal and another terminal.

10. A method for adjusting a terminal setting, comprising:
detecting, by a terminal, a first trigger event;
obtaining, by the terminal, from control conditions, a first control condition corresponding to the first trigger event, wherein the first trigger event comprises a first operation event operating a first application or that a current system time of the terminal reaches a preset starting time associated with the first application; and
adjusting, by the terminal, the terminal setting according to the first control condition,
wherein before the obtaining, from the control conditions, the first control condition corresponding to the first trigger event, the method further comprises:
determining, according to a type of the first application, the terminal setting to be adjusted;
receiving a specified value that is input by a user and that corresponds to the terminal setting; and
generating the first control condition based on the specified value.

11. A terminal, comprising:
a processor; and
a memory configured to store relevant data run by the processor to cause the terminal to:
detect a first trigger event,
obtain, from control conditions, a first control condition corresponding to the first trigger event, wherein the first trigger event comprises a first operation event operating a first application or that a current system time of the terminal reaches a preset starting time associated with the first application, and
adjust a terminal setting according to the first control condition, wherein when the first control condition comprises multiple sub-control conditions, the multiple sub-control conditions respectively correspond to a different control time, and the sub-control conditions respectively correspond to different terminal settings and/or different specified values of a same terminal setting, the adjusting, by the processor, the terminal setting according to the first control condition comprises:
sequentially invoking the multiple sub-control conditions according to the control time respectively corresponding to the multiple sub-control conditions, and
adjusting the terminal setting according to each sub-control condition.

12. The terminal according to claim 11, wherein the processor is further configured to cause the terminal to:
determine a preset closing time associated with the first application according to a time generated according to: received user input information, or a time obtained by collecting statistics of previous closing times at which the first application is closed, or an end time corresponding to a use validity period of the first application; and
determine a preset control duration associated with the first application according to a duration generated according to the received user input information, or a duration obtained by collecting statistics of previous use durations within which the first application is used, or a duration corresponding to the use validity period of the first application.

13. The terminal according to claim 12, wherein the processor is further configured to cause the terminal to:
before adjusting the terminal setting according to the first control condition, record a current first specified value of the terminal setting to be adjusted according to the first control condition, and
after adjusting the terminal setting according to the first control condition:
obtain the first specified value if a second trigger event is detected, wherein the second trigger event comprises a second operation event operating the first application, or that the current system time of the terminal reaches the preset closing time associated with the first application, or that use duration in the first control condition reaches the preset control duration associated with the first application, and
adjust, according to the first specified value, the terminal setting corresponding to the first control condition.

14. The terminal according to claim 13, wherein the first application is a non-contact application, and the processor is further configured to cause the terminal to: when it is detected that the first application is read by the non-contact application for a second time, detect the first operation event.

15. The terminal according to claim 11, wherein the processor is further configured to cause the terminal to determine a preset starting time associated with the first application according to a time generated according to a received user input information, or a time obtained by collecting statistics of previous starting times at which the first application is started, or a start time corresponding to a use validity period of the first application.

16. The terminal according to claim 11, wherein the processor is further configured to cause the terminal to generate the first control condition according to any one or a combination of: a type of the first application, a specified value corresponding to the terminal setting within a preset time period during or after previous running of the first application, or received user indication information.

17. The terminal according to claim 16, wherein the generating, by the processor, the first control condition according to the specified value corresponding to the terminal setting within the preset time period during or after previous running of the first application comprises:
obtaining the specified value corresponding to the terminal setting within the preset time period during or after the previous running of the first application, and using the specified value to obtain a first specified statistic value corresponding to the terminal setting; and
generating the first control condition based on the first specified statistic value.

18. The terminal according to claim 11, wherein the processor is further configured to cause the terminal to:
determine, according to a type of the first application, the terminal setting to be adjusted;
obtain, according to a specified value that corresponds to the terminal setting and that is generated during previous use of the terminal, a specified statistic value corresponding to the terminal setting; and
generate the first control condition based on: the specified statistic value, or the specified statistic value and received user indication information.

19. The terminal according to claim 11, wherein the processor is further configured to cause the terminal to:
determine, according to a type of the first application, the terminal setting to be adjusted;
receive a specified value that is input by a user and that corresponds to the terminal setting; and
generate the first control condition based on the specified value.

* * * * *